United States Patent [19]

Kovacic

[11] Patent Number: 5,793,913
[45] Date of Patent: Aug. 11, 1998

[54] METHOD FOR THE HYBRID INTEGRATION OF DISCRETE ELEMENTS ON A SEMICONDUCTOR SUBSTRATE

[75] Inventor: Stephen J. Kovacic, Kanata, Canada

[73] Assignee: Northern Telecom Limited, Montreal, Canada

[21] Appl. No.: 677,922

[22] Filed: Jul. 10, 1996

[51] Int. Cl.$^6$ ............................................. G02B 6/30
[52] U.S. Cl. ........................... 385/49; 372/46; 359/250; 257/13
[58] Field of Search ........................ 372/46, 50, 34, 372/96, 45; 385/49, 90, 14, 35, 89; 359/248, 250; 257/13, 14

[56] References Cited

U.S. PATENT DOCUMENTS

| | | |
|---|---|---|
| 4,836,887 | 6/1989 | Daubenspeck et al. |
| 5,013,681 | 5/1991 | Godbey et al. |
| 5,138,625 | 8/1992 | Paoli et al. ........................ 372/46 |
| 5,242,856 | 9/1993 | Kurihara et al. ................... 438/33 |
| 5,292,685 | 3/1994 | Inoguchi et al. .................. 372/96 |
| 5,297,158 | 3/1994 | Naitou et al. ..................... 372/32 |
| 5,303,255 | 4/1994 | Kudo et al. ....................... 372/96 |
| 5,413,679 | 5/1995 | Godbey. |
| 5,481,629 | 1/1996 | Tabuchi ............................. 385/14 |
| 5,499,732 | 3/1996 | Nishimoto. |
| 5,513,200 | 4/1996 | Paoli .................................. 372/50 |
| 5,585,957 | 12/1996 | Nako et al. ....................... 257/13 |
| 5,689,358 | 11/1997 | Nakao ............................... 359/248 |
| 5,715,267 | 2/1998 | Iwase ................................ 385/90 |

OTHER PUBLICATIONS

D.L. Harame, J.D. Cressler, E.F. crabbe, J.Y-C. Sun, B.S. Meyerson and T. Tice, "Si/SiGe Epitaxial-Base Transistors — Part I: Materials, Physics and Circuits", IEEE Transactions on Electron Devices, vol. 42, No. 3, Mar. 1995, pp. 455–468.

R.A. Soref, "Silicon-Based Optoelectronics", Proceedings of the IEEE, vol. 81, No. 12, Dec. 1993; pp. 1687–1705.

G.S. Oehrlein, T.D. Bestwick, P.L. Jones, M.A. Jaso and J.L. Lindstrom, "Selective Dry Etching of Germanium with Respect to Silicon and Vice Versa" J. Electrochem. Soc., vol. 138, No. 5, May 1991, pp. 1443–1452.

Primary Examiner—Akm E Ullah

[57] ABSTRACT

A method and apparatus is provided for locating with improved vertical positioning accuracy a discrete element on a semiconductor optoelectronic integrated circuit. The method employs an etch stop layer located beneath a series of semiconductor layers. The semiconductor layers may include waveguides to couple light between integrated or discrete elements. Pits with accurate depth are etched in the semiconductor layers down to the etch stop layer. Accurate alignment between a discrete element and another element is made possible by controlling their respective distances from the etch stop layer.

8 Claims, 6 Drawing Sheets

F I G. 2
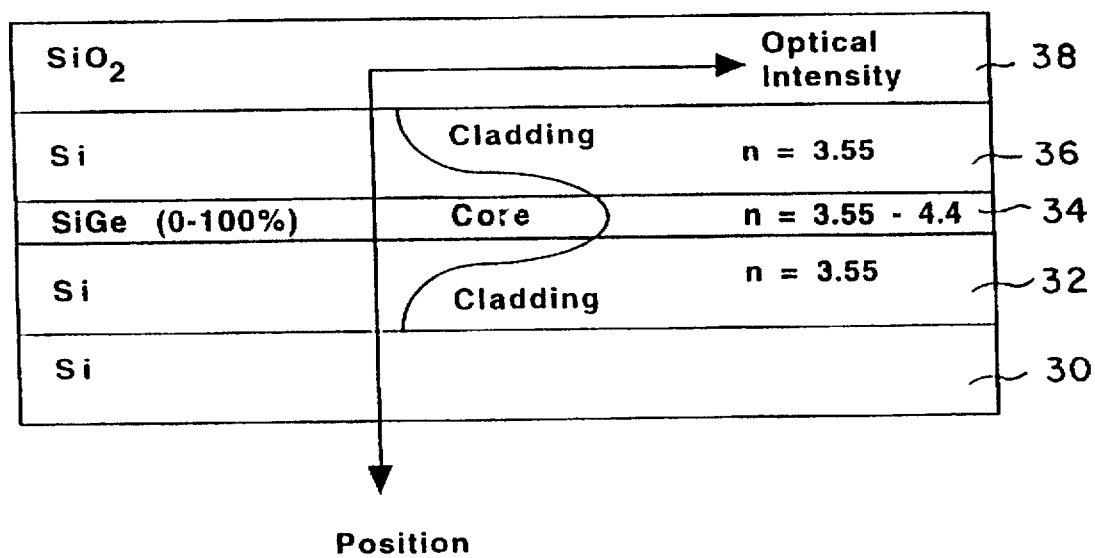

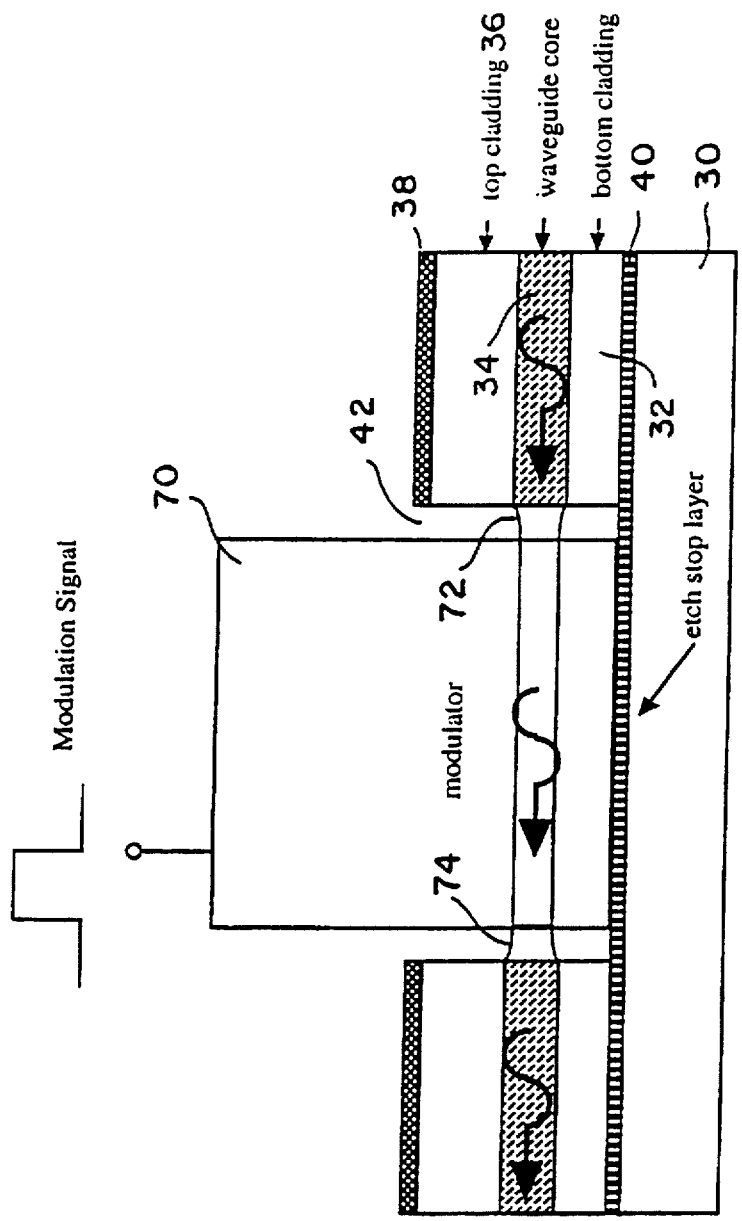
F I G. 6

METHOD FOR THE HYBRID INTEGRATION OF DISCRETE ELEMENTS ON A SEMICONDUCTOR SUBSTRATE

FIELD OF THE INVENTION

The invention relates to a method for the hybrid integration of a discrete element on a semiconductor substrate.

BACKGROUND OF THE INVENTION

Various approaches exist for integrating together components or elements forming part of an optoelectronic circuit. The ability to efficiently couple light amongst various components forming part of an optoelectronic circuit is a fundamental requirement for any such approach.

Optical and optoelectronic components may in some cases be integrated onto a semiconductor wafer monolithically, where all of the components are fabricated on the wafer. One method of coupling light amongst components monolithically integrated as part of an OEIC (optoelectronic integrated circuit) is to fabricate waveguides connecting the components on the OEIC concurrently with the fabrication of active and passive optical devices. This monolithic approach is a difficult undertaking, as the fabrication process required for one type of device or waveguide may be incompatible with that required for another. In addition, the semiconductor layer structures required to implement the various waveguides and devices may differ radically. For example, the layer structure required for a semiconductor diode laser may be completely different from that required for a waveguide. If this is the case, a possible solution is to etch the unwanted layers away from a certain area and epitaxially deposit or grow an alternate layer structure. However, this compromise is not amenable to efficient manufacturing, and the regrown layers may have lower quality.

In another integration scheme, an array of surface emitting lasers on an OEIC communicate with other OEICs through free space transmission. The optical signal is emitted perpendicular to the plane of the OEIC having the surface emitting lasers, and the optical beams impinge upon detectors on an OEIC placed above the lasers. Alternatively, the beams are reflected from a mirror back towards the same OEIC having the surface emitting lasers or reflected towards another OEIC. Again, the reflected beams impinge upon detecting elements on the OEIC. In either case, optical signals are distributed across the OEIC without the use of waveguides. A severe limitation of this technique is that the optical signal cannot be split. In addition, great accuracy is required to position the mirror array above the first OEIC.

Another method involves placing some separately fabricated (discrete) optoelectronic optical elements onto an OEIC which contains waveguides to couple light between various components. The OEIC must have placement locations or pits for the discrete components. Such an OEIC may be referred to as an optical wafer-bench, in which the substrate can be thought of as a "motherboard" upon which components are placed. The OEIC may also contain some integrated components like photodetectors, high-speed electronics, etc. This approach involves the integration of the discrete optical elements, onto the wafer-bench containing other optical elements and is referred to as hybrid integration. The key to achieving efficient optical coupling is to position the optical elements precisely onto the waferbench. For instance, alignment of a laser with an integrated waveguide requires a high degree of vertical positioning accuracy. The lateral positioning of the laser is less problematic because it is possible to define tapered waveguides having a large numerical aperture in the lateral direction. The position of the laser relative to the waveguide will affect the insertion loss for the signal emanating from the laser. In another example, a modulator might be positioned between two segments of an integrated waveguide. Again, the position of the modulator (input and output) relative to the position of the waveguide determines how much light is lost simply in the coupling. The absence of a simple, reliable method for performing the vertical alignment step in this type of integration has been a factor limiting its widespread application.

The losses related to the connection of the optical elements influence the required sensitivity of detector elements as well as the optical output required of emitter elements. While losses within an optical element can be reduced by appropriate component design, it is difficult to factor in the losses associated with coupling between optical elements. Connection losses are inherently variable and this forces the OEIC designer to consider the effect of both the maximum and minimum optical signal power levels on the circuit. Any new method of minimizing coupling losses between active or passive optical elements and waveguides, minimizing the variability of such losses, or enhancing robustness and manufacturability, will be of tremendous value to the realization of cost-effective OEICs.

In the past, discrete devices have been aligned with other discrete devices or with integrated devices by methods which include some form of active positioning. For example, some systems employ a feed-back control loop to monitor light intensity as the device is being placed, the device being fixed in place when the intensity is optimum.

In U.S. Pat. No. 5,413,679 to Godbey, a method of producing a silicon membrane using a silicon alloy etch stop layer is disclosed and in U.S. Pat. No. 5,013,681 to Godbey et al, a method of producing a thin silicon-on-insulator layer is disclosed, also using a silicon alloy etch stop layer. In both of these methods, the purpose of the etch stop layer is to provide a backstop for the manufacture of a thin layer of silicon. The starting structure for these methods includes a thin layer of silicon (which in the case of the second above referenced patent is located on an insulating layer), an etch stop layer, and several other layers atop the etch stop layer. The layers atop the etch stop layer are etched away leaving the thin layer of silicon and the etch stop layer. The etch stop layer is then removed leaving the required thin layer of silicon. In these methods, the etch stop layer is not used for alignment purposes, and is not even present in the final manufactured article.

SUMMARY OF THE INVENTION

An object of the invention is to provide a method which uses a semiconductor heterostructure having waveguides defined to link both monolithic and hybrid integrated discrete optical elements to create a type of optical wafer-bench described above, with which very accurate vertical and lateral positioning of hybrid optical elements, like a laser, can be achieved.

The invention provides a technique addressing the difficulty in obtaining very accurate vertical positioning of discrete components on an OEIC.

According to a first broad aspect, the present invention provides a method for the hybrid integration of a discrete device on a semiconductor substrate comprising the steps of: a) forming an etch stop layer above a substrate; b) forming at least one semiconductor layer above the etch stop layer, the at least one semiconductor layer including a first layer fabricated directly on the etch stop layer, the etch stop layer having an etch rate which is slower than that of the first layer on the etch stop layer with a particular etch process; c) selectively etching with the particular etch process the at least one semiconductor layer above the etch stop layer down to the etch stop layer to define a first device pit having a base surface;d) placing in said device pit a first discrete device to rest on said base surface; wherein accurate vertical placement of said discrete device is achieved due to accuracy of the depth of said pit as determined by said etch stop layer.

According to a second broad aspect, the invention provides a method for the hybrid integration of a discrete device on a semiconductor substrate comprising the steps of:a) forming an etch stop layer above a substrate; b) forming at least one semiconductor layer above the etch stop layer, the at least one semiconductor layer including a first layer fabricated directly on the etch stop layer, the etch stop layer producing a characteristic signature when etched with a particular etch process and having an etch rate which is slow enough that upon detection of the characteristic signature during the etch process, the etch process can be quickly stopped; c) selectively etching with the particular etch process the at least one semiconductor layer above the etch stop layer down to the etch stop layer to define a first device pit having a base surface; d) placing in said device pit a first discrete device to rest on said base surface; wherein accurate vertical placement of said discrete device is achieved due to accuracy of the depth of said pit as determined by said etch stop layer.

In a preferred embodiment, the technique is used for the formation of hybrid OEIC's. This involves forming a waveguide on the etch stop layer and etching through the layers of the waveguide to the etch stop layer. When a discrete device, for example a laser or a modulator, is placed in the pit it is vertically aligned with the core layer of the waveguide.

The precise vertical alignment afforded by the use of an etch stop alleviates many difficulties associated with coupling the optical signal between discrete elements.

BRIEF DESCRIPTION OF THE DRAWINGS

Preferred embodiments of the invention will now be described with reference to the attached drawings in which:

FIG. 2 is a side sectional view of a heterostructure enabling the formation of waveguides;

FIG. 6 is a side sectional view of a waveguide forming part of an OEIC, and optically coupled with a modulator.

DETAILED DESCRIPTION OF THE PREFERRED EMBODIMENTS

Figure 1:
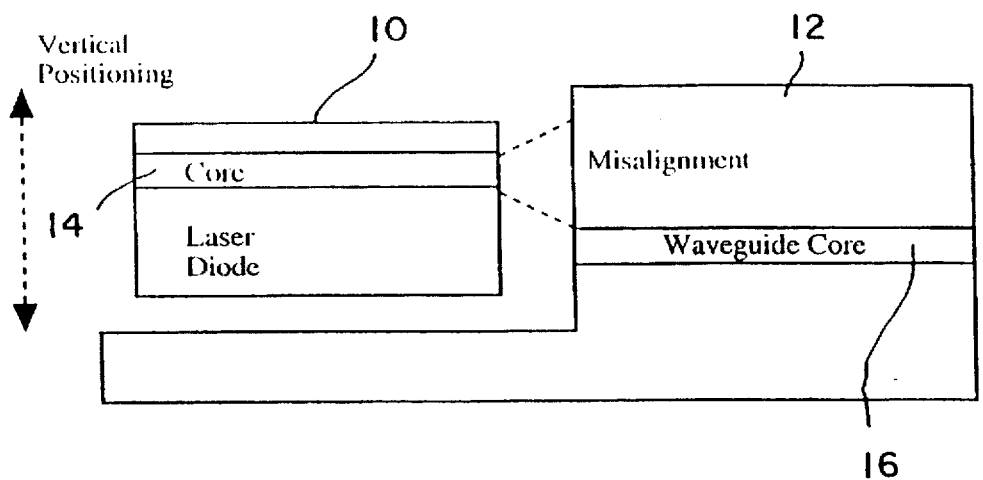
FIG. 1 is a side sectional view of a laser diode which is misaligned with respect to an OEIC.

FIG. 1 illustrates a typical example of a hybrid integration problem. A discrete optical device such as a laser diode 10 needs to be installed on an OEIC (optoelectronic integrated circuit) 12 such that the core 14 of the laser diode is accurately vertically aligned with a waveguide core 16 forming part of the OEIC. Misalignment between the cores 14,16 will result in increased coupling loss between the two devices.

FIG. 2 illustrates an example of a layered structure from which the OEIC is made. A substrate 30 is shown upon which a bottom silicon cladding layer 32, a SiGe alloy core layer 34, a top silicon cladding layer 36, and a silicon dioxide layer 38 are located. Vertical confinement of light to the core layer 34 results due to the core having a larger index of refraction than the adjacent cladding layers 32,36. Even small fractions of Ge (0.01–0.02) will give rise to differences in the index of refraction between the alloy and pure Si which are sufficient to vertically confine light in a planar waveguide. When small fractions such as these are utilized, issues associated with alloy stability and thermal is decomposition of $Si_{1-x}Ge_x$ where x>0.05 are avoided.

Figure 3:
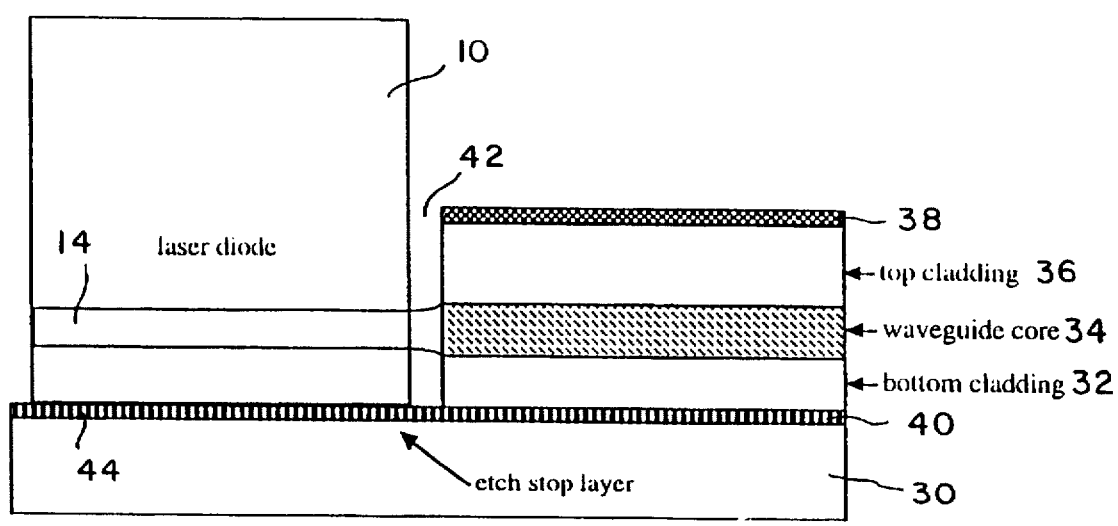
FIG. 3 is a side sectional view of a laser diode correctly aligned with an OEIC with a method provided by an aspect of the invention.

FIG. 3 illustrates a heterostructure according to an embodiment of the invention which permits accurate vertical alignment of hybrid devices. Shown is a substrate 30 upon which an etch stop layer 40 is located. Upon the etch stop layer is located a series of layers which permits the fabrication of on-chip optical devices. In the illustrated embodiment, this series of layers comprises the waveguide structure of FIG. 3, namely bottom cladding layer 32, waveguide core 34, top cladding layer 36 and silicon dioxide layer 38 as described above. The etch stop layer 40 is made of a material which has an etch rate which is slower for a particular etch process than that of layer 32 above the etch stop layer, thus having a suitable etch rate ratio, the etch rate ratio being defined as the ratio of the etching rate of the layer 32 to the etching rate of the etch stop layer 40. An appropriate material for the etch stop layer in the illustrated embodiment is a SiGe (silicon germanium) alloy. One suitable germanium fraction for a 200 Å thick SiGe alloy layer is 0.5. Other alloy fractions which are much smaller or larger than 0.5 will also work and are not intended to be excluded and depending on th e thickness of the alloy layer these fractions may or may not induce dislocations. For example, a pure Ge etch stop layer would provide better etch selectivity, but would induce dislocations. If a dislocation free crystal is a requirement, then a pure Ge etch stop layer would be inappropriate.

Because of the difference between the etch rate of the etch stop layer and the layer above the etch stop layer, device pits can be etched to an accurate depth by etching away the layers above the etch stop layer in selected regions, and stopping the etch process when the etch process reaches the etch stop layer. The etch rate slows down once the etch stop layer is encountered, and this enhances the control over the accuracy of the depth of the pit by making the depth of the pit less sensitive to the timing control of the etch process. $SF_6/H_2/CF_4$ plasmas have been shown to have large etch rate ratios between pure Si and alloys of $Si_{1-x}Ge_x$. In deed, G.S. Oehrlein et. al. in a publication titled "Selective Dry Etching of Germanium with Respect to Silicon and Vice Versa," J. Electrochem. Soc., Vol. 138, 1991, have shown that at an rf power of 50 Watts in a plasma of $SF_6/H_2/CF_4$ the etch rate of Si is very large compared with that of SiGe.

As a specific example, consider a heterostructure as illustrated in FIG. 3 having a 0.02 µm thick SiGe etch stop layer 30 with a germanium fraction of 0.5, 1 µm thick Si bottom and top cladding layers 32,36, and a 1 µm thick SiGe waveguide core layer 34 with a germanium fraction of 0.02. A reactive ion etch process consisting of a 15 mtorr discharge of the etchant $SF_6/H_2/CF_4$ at an RF power of 75 Watts will etch the waveguide layers at the rate of about 6 nm/min but will only etch the SiGe etch stop layer at the rate of 1 nm/min. The three waveguide layers 32,34,36 will each take approximately 166 minutes to etch, while the etch stop layer will etch through approximately half of its thickness in 10 minutes and will etch through its entire thickness in 20 minutes. In order to determine when to stop the etch process in this embodiment, preferably a timer would be employed to time the etch for a period of time which is the minimum time or less than the minimum time it would take to reach the etch stop layer. In this example, the layers 32,34,36 above the etch stop layer will etch in about 498 minutes, so the timer might be set for 475 minutes. After this, the trace gases produced by the etch are analyzed for a "detectable signature" indicative of the presence of germanium. This "end-point detection" method is discussed further below. Once germanium is present in the trace gas, then the etch stop layer has been reached, and it is time to stop the etch. With this example, there exists a 10 minute window during which to stop the etch once the germanium signal has been detected with less than 0.01 µm error introduced in the depth of the etch. If the etch stop layer were replaced with a 0.02 µm thick pure silicon layer, the etch would punch entirely through this layer in about 3 minutes. In the above example, the etch stop layer is SiGe with an etch process consisting of reactive ion etching with an etchant consisting of $SF_6/H_2/CF_4$. However, other etch stop layer materials, etch processes and etchants may be employed.

The etch stop layer has an accurate predetermined location and as a result accurate distances from the floor of the pit which is approximately coplanar with the top of the etch stop layer to points within the layered structure above the etch stop layer may be achieved, and are determined by the growth of these layers on the etch stop layer. On-chip devices may be made, and features or reference points of these devices will be located at accurate predetermined distances from the etch stop layer. Discrete devices placed in the device pits have a base surface which will be located against the etch stop layer. Each discrete device may require accurate alignment with another discrete device or an on-chip device and in particular it may be that a feature or reference point of such a discrete device must be aligned with a feature or reference point of another device. This is achieved by making the devices such that the respective features or reference points will be equal in distance from the etch stop layer.

Figure 4:
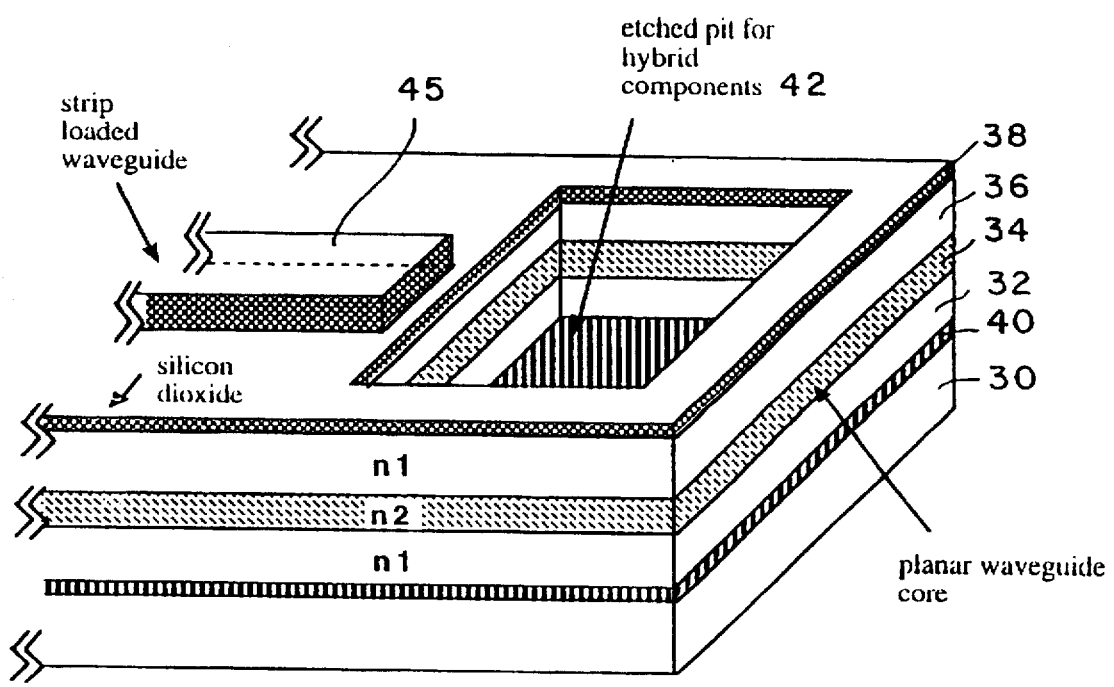
FIG. 4 is a perspective view of an OEIC heterostructure according to an aspect of the invention in which a pit has been etched.

For example, referring to FIGS. 3 and 4, a device such as a laser diode 10 is to be installed so as to be optically coupled to an on-chip optical waveguide and this requires accurate alignment of the core 14 of the diode 10 with the core 34 of the waveguide. A device pit 42 has been etched to an accurate depth as defined by the etch stop layer 40, and the base surface 44 of the laser diode 10 is placed in the pit 42 against the etch stop layer. The bottom of the pit may be metallized to provide electrical contact to the laser diode. The depth of the pit controls the height of the laser diode relative to a waveguide which intersects the pit. To achieve optical coupling, accurate alignment between the core 14 of the laser diode 10 and the core 34 of the on-chip waveguide may be done, for example, by aligning the centres of the respective cores. By constructing the laser diode and on-chip waveguide such that the centres of their respective cores are substantially the same distance from the etch stop layer when the diode is installed, accurate alignment of the cores is achieved. Without the presence of the etch stop layer, it would be impractical to etch to a depth sufficiently accurate to allow such a method to be employed.

In order to make channel waveguides from the heterostructure illustrated in FIG. 3, lateral confinement of light within the core layer is also required. This may be achieved by using LOCOS (local oxidation of silicon) regions for the silicon dioxide layer. The details of such a heterostructure and the use of LOCOS regions is described in applicant's copending U.S. application Ser. No. 08/609930, filed on Feb. 29, 1996 and titled "Semiconductor Optical Waveguide" hereby incorporated by reference. The LOCOS regions provide lateral confinement of light to the areas between LOCOS regions. Alternatively, other known techniques for making channel waveguides may be used. Ridge channel waveguides may be formed by having ridges of thicker silicon dioxide or by strip loading as illustrated in FIG. 4.

Figure 5:
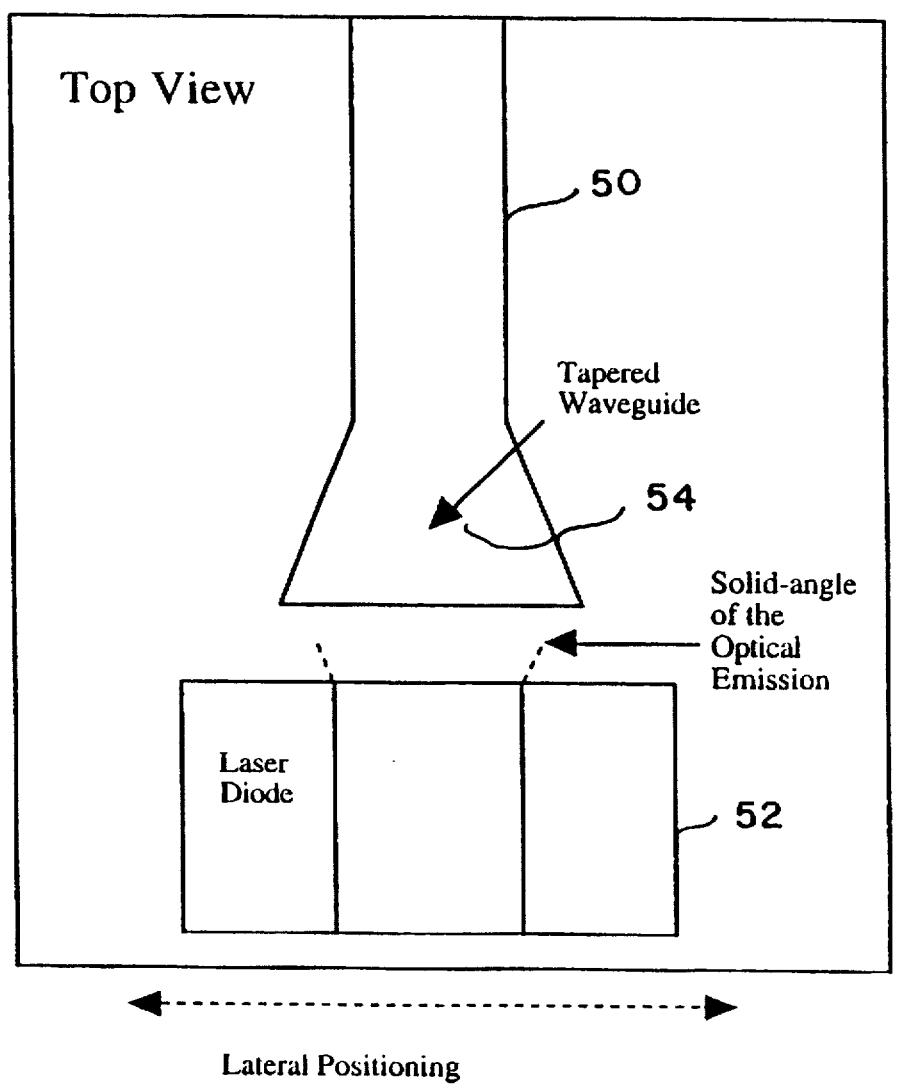
FIG. 5 is a top view of a tapered waveguide on an OEIC optically coupled with a laser diode.

Lateral alignment of a discrete device presents much less of a problem than vertical alignment and is achieved using conventional methods. Gross alignment is inherent by defining a pit of finite width and length. In FIG. 4, a device which is placed in the pit 42 requires lateral alignment with a strip loaded waveguide 45 and this can be easily achieved by accurately locating and sizing the pit while it is etched. In FIG. 5, a waveguide 50 with which a laser diode 52 is to be coupled has a tapered section 54, further reducing the sensitivity to lateral placement of the diode. Alternatively, a lensed waveguide may been used to reduce the sensitivity to the lateral placement of the discrete device.

Another example of the application of the etch stop to achieving vertical alignment of a discrete device is illustrated in FIG. 6. A modulator 70 is inserted between two waveguides. Again, the optical signal at the input 72 and output 74 of the modulator can be precisely vertically aligned simply by controlling the depth of the pit 42 into which the modulator is placed.

An etch stop layer may also be used to accurately vertically position other discrete devices such as a photodiode.

Figure 7:
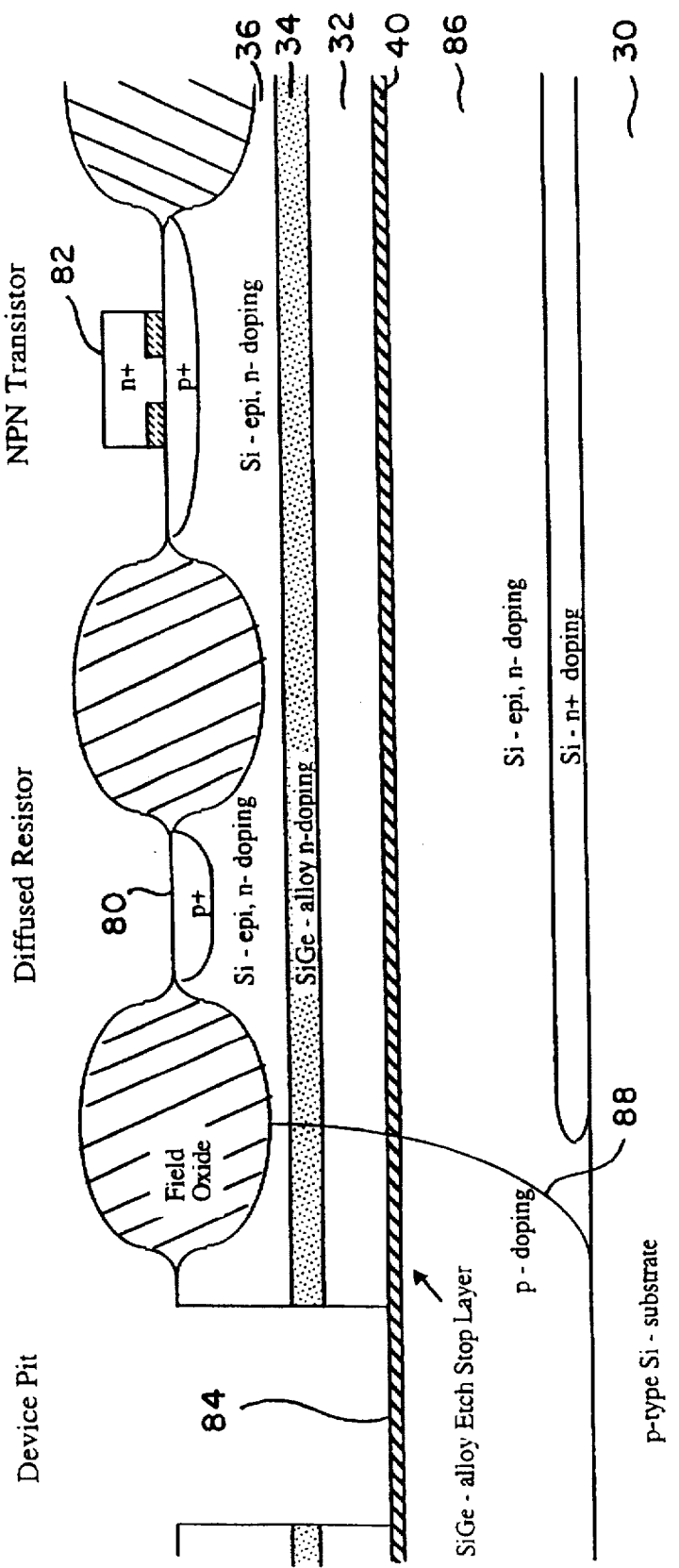
FIG. 7 is a side sectional view of an OEIC having two on-chip fabricated components and a device pit.

In FIG. 7, a sectional view of an OEIC is shown in which devices consisting of a diffused resistor 80 and an NPN transistor 82 have been fabricated in the layers of the heterostructure, and a device pit 84 is also present. Layers 30,40,32,34,36 are similar to those described previously with reference to FIG. 3. An additional silicon layer 86 is shown interposed between the etch stop layer 40 and the substrate 30. The layers 86,40,32,34,36 are lightly p-doped beneath the device pit 84 to the left of demarcation line 88, and are lightly n-doped beneath the devices 80,82 to the right of the demarcation line. In this case, the composition of the etch stop layer must not adversely affect the fabrication and operation of these additional devices. This requires the entire heterostructure to be substantially free of dislocations.

Numerous modifications and variations of the present invention are possible in light of the above teachings. It is therefore to be understood that within the scope of the appended claims, the invention may be practised otherwise than as specifically described herein.

For example, the invention is not limited to the material system chosen. A number of properties are required for any appropriate material system. Firstly, the heterostructure system must include layers for the formation of integrated devices or elements. If these include waveguides, then the heterostructure must be a natural waveguiding system. For this purpose, the heterostructure includes a core layer and cladding layers, the index of refraction in the core layer being greater than the index in the cladding layers. The thickness and composition of the core layer, the cladding layers are parameters of the waveguide design.

The second key factor is that the heterostructure must include an etch stop layer for stopping the etch process at the appropriate depth. In the above example, the etch stop layer has an etch rate which is slower than that of the layer above the etch stop layer, and the material in the etch stop layer also produces a detectable signature. The etch rates and etch rate ratio depend on the etch chemistry. Although it is preferred that an etch stop layer material have both a suitable etch rate ratio and a detectable signature, an etch stop layer having either one of these two features alone will also work. Although any decrease in the etch rate of the etch stop layer with respect to the etch rate of the layer above the etch stop layer is helpful in providing leniency in the timing of the etch, it is preferred that the etch stop layer have an etching rate which is much slower than that of the layer above it. How these two characteristics, namely etch rate ratio and detectable signature are used either alone or in combination to stop the etch is discussed further below.

The etch stop layer is a continuous planar layer grown at a constant depth. In some circumstances, it may be desirable to have more than one etch stop layer. For example, if there are two etch stop layers, at least one layer of a different etching material would be located between the two etch stop layers, the different etching material being one with either a faster etch rate or a different characteristic signature. Hypothetically, the etch stop might be a series of regions at varying depths. Depending on the nature of the various etch rates, several approaches for stopping the etch process at the required depth exist.

It may be that the etch stop layer is entirely impervious to the etch in which case the etch rate ratio is infinite, the etch stops completely and the vertical accuracy is infinitely precise. It is noted that at this time, no specific material is known which would grow epitaxially on Si and is also impervious to an etch which etches Si.

Timing alone of the etch process may be used to control the depth of the etch process. In this case, the etch stop layer must have an etch rate ratio such that the etch rate slows down considerably when the etch stop layer is encountered resulting in a degree of leniency in the timing of when to stop the etch process. The slower the etch rate in the etch stop layer, the larger the latitude in the timing of the etch process for the same pit depth accuracy.

Rather than timing the etch process, the end-point detection method alone may be used to stop the etch. The endpoint detection method involves the use of a monitoring system such as a residual gas analyser to monitor trace gases produced by the etch process, and to look for a characteristic signature unique to the etch stop layer. In the SiGe example, the monitoring system looks for the presence of germanium in the trace gases produced during the etch process. When the signature is detected, the etch process is stopped. When this approach is used, it is not essential that the etch stop layer etch at a rate which is slower than that of the other layers, but it must etch at a rate slow enough that after detection of the end-point, the etch process can be stopped within a reasonable depth thereafter. Combined use of end-point detection with a favourable etch rate ratio is the preferred way to achieve accurate vertical etch depth. With this combined approach, the etch may be timed for the minimum time or slightly less than the minimum time it might take to etch all the way to the etch stop layer. Then the end-point detection technique is used to accurately determine exactly when to attempt to stop the etch. The favourable etch rate ratio provides leniency in the timing of stopping the etch.

The etch stop layer does not need to be made of the same alloy as the waveguide channel layer. If it is made of the same alloy and the "signature" approach is used to control when to stop the etching then in monitoring the signals produced during etching, a first signature indicating the presence of the alloy would be detected during the etching of the waveguide channel layer and a second similar signature would be detected when the etch stop layer is encountered. When this second signature is detected, the etch process is stopped. Similarly, if a timed etch process is to be used, then a larger amount of time must be allotted to etch through the waveguide channel layer.

More generally, during the etching of the various layers, there may be several increases and decreases in the etch rates of the layers with respect to adjacent layers. There will always be a decrease in the etch rate between the layer above the etch stop layer and the etch stop layer itself. When controlling the etch, these increases and decreases must be accounted for when timing the etch, or when monitoring the gases produced by the etch.

The etch stop layer is not limited to the application of defining pits with accurate depth. Other features such as channels and mesas may be defined so as to have accurate vertical dimensions by etching appropriate areas down to the etch stop layer.

The etch stop layer does not necessarily have to be directly on the substrate. Other layers may be between the substrate and the etch stop layer, but it will not be practical to form pits with accurate depth which extend into these layers.

It is preferred that the heterostructure includes a set of waveguide layers followed by or including layers suitable for the formation of heterojunction bipolar transistors. In this manner, both electronic and waveguide elements can be fabricated on the same underlying wafer. The Si/SiGe heterostructure is particularly suitable for this purpose. In this case, the heterostructure must be substantially dislocation free. A preferred range for the germanium fraction the waveguide core layer in this case is 0.01 to 0.1 and a preferred germanium fraction for the etch stop layer is 0.50. The maximum thickness a layer with a given germanium content may have before inducing dislocations is inversely related to the germanium content. Thus, higher germanium fractions may be used for either the waveguide core layer or the etch stop layer providing these layers are sufficiently thin.

There are other material systems where comparable properties can be employed to realize the type of precise hybridization method described herein. For example, an InGaAsP/InP or other III–V heterostructures could be used. To etch InP, an etch stop layer of InGaAsP is effective with an etch consisting of 2 parts HCl with 3 parts $H_3PO_4$. To etch InGaAsP, an etch stop layer of InP is effective with an etch consisting of 1 part $H_2SO_4$, 5 parts $H_2O_2$, and 50 parts $H_2O$. In these examples, the etches are wet etches and not reactive ion etches.

In yet another material system, the etch stop layer is InGaAs, and the layers above the etch stop layer are InP. In this case, the reactive ion etching method would be used, and the end-point detection method would be used to stop the etch. The etching is turned off when the "Ga" signal is detected using mass spectrometry. As before, the etch may also be timed in order to determine a window during which to look for the appropriate end-point signal.

The invention is not limited to achieving accurate vertical alignment between a discrete device and an integrated device. It may be applied to achieving accurate vertical alignment between two discrete devices, or simply to achieving a repeatable accurate absolute vertical location of a discrete device on an OEIC.

The embodiments of the invention in which an exclusive property or privilege is claimed are defined as follows:

1. A vertically aligned optoelectronic arrangement comprising
   an etch stop layer on a substrate;
   a waveguide formed on said etch stop layer comprising in sequence a first cladding layer, a waveguide core, and a second cladding layer;
   a pit etched in said waveguide down to said etch stop layer; and
   a discrete element placed in said pit;
   whereby accurate vertical alignment of said discrete element and said core is achieved by due to the accuracy of their relative distances from the etch stop layer.

2. The apparatus of claim 1 wherein said discrete element is a laser diode.

3. The apparatus of claim 1 wherein said discrete element is a modulator.

4. The apparatus of claim 1 wherein said discrete element is a photodiode.

5. The apparatus of claim 1 wherein said etch stop layer is silicon germanium alloy.

6. The apparatus of claim 5 wherein said first and second cladding layers are silicon, and said core layer is silicon germanium alloy with a germanium fraction in the range of 0.01 to 0.10.

7. The apparatus of claim 6 wherein said etch stop layer has a germanium fraction of approximately 0.5.

8. The apparatus of claim 1 wherein said pit has a metallized base surface.

* * * * *